United States Patent [19]
Sickels et al.

[11] Patent Number: 5,829,132
[45] Date of Patent: Nov. 3, 1998

[54] METHODS OF ASSEMBLING AN EXHAUST PROCESSOR

[75] Inventors: Mark Allen Sickels; James Dale Quackenbush, both of Columbus, Ind.

[73] Assignee: Arvin Industries, Inc., Columbus, Ind.

[21] Appl. No.: 689,310

[22] Filed: Aug. 7, 1996

[51] Int. Cl.[6] .............................. B23P 15/00; F01N 3/20; B01D 53/00; B01D 50/00
[52] U.S. Cl. ................ 29/890; 29/505; 29/515; 422/177; 422/179
[58] Field of Search ................... 422/179, 177; 29/890, 505, 515

[56] References Cited

U.S. PATENT DOCUMENTS

| | | | |
|---|---|---|---|
| 3,159,239 | 12/1964 | Andrews . | |
| 3,902,853 | 9/1975 | Marsee et al. | 422/171 |
| 3,972,687 | 8/1976 | Frietzsche | 422/180 |
| 3,984,207 | 10/1976 | Abthoff et al. | 422/179 |
| 4,160,010 | 7/1979 | Öttle | 422/180 |
| 4,519,120 | 5/1985 | Nonnenmann et al. | 29/890 |
| 4,775,518 | 10/1988 | Abthoff et al. | 422/179 |
| 4,969,264 | 11/1990 | Dryer et al. | 29/890 |
| 5,004,018 | 4/1991 | Bainbridge | 138/149 |
| 5,118,476 | 6/1992 | Dryer et al. | 422/179 |
| 5,173,267 | 12/1992 | Maus et al. | 422/179 |
| 5,293,743 | 3/1994 | Usleman et al. | 60/299 |
| 5,408,828 | 4/1995 | Kreucher | 60/299 |

FOREIGN PATENT DOCUMENTS 34 30 398 A1  2/1986  Germany .

OTHER PUBLICATIONS

Richard C. Kuisell, *Butting Monoliths in Catalytic Converters*, 135–140.

*Primary Examiner*—Lora M. Green
*Assistant Examiner*—Joseph W. Ricigliano
*Attorney, Agent, or Firm*—Barnes & Thornburg

[57] ABSTRACT

A method is provided for assembling an exhaust processor including a housing formed from a tube having an inlet end and an outlet end, an internal inlet cone shield, a substrate, and an internal outlet cone shield. The housing includes an inlet end and an outlet end. The inlet end of the tube is sized down to a desired inlet diameter to form the inlet end of the housing. The internal inlet cone shield is installed into the tube through the outlet end of the tube. The substrate is inserted into the tube through the outlet end of the tube. The internal outlet cone shield is installed into the tube through the outlet end of the tube. The outlet end of the tube is sized down to a desired outlet diameter to form the outlet end of the housing.

40 Claims, 5 Drawing Sheets

METHODS OF ASSEMBLING AN EXHAUST PROCESSOR

BACKGROUND AND SUMMARY OF THE INVENTION

The present invention relates to an exhaust processor apparatus for treating emissions from combustion product produced by an engine, and, particularly to a method of assembling such an exhaust processor. More particularly, this invention relates to an exhaust processor assembly method for mounting a substrate in a passageway formed in a necked-down outer shell.

For environmental reasons, engine combustion product or exhaust must be cleaned on board a vehicle before it is expelled into the atmosphere. This processing is accomplished by passing the untreated combustion product produced by the engine through an exhaust processor to minimize unwanted emissions.

Catalytic convertors are well-known exhaust processors and are used to purify contaminants from hot combustion product discharged from an engine exhaust manifold. Within a catalyzed exhaust processor, the combustion product is treated by a catalyzed ceramic or metal substrate which converts the exhaust gases discharged from the engine primarily into carbon dioxide, nitrogen, and water vapor. The catalytic converter treats engine combustion product to produce an exhaust stream meeting stringent state and federal environmental regulations and emission standards. After processing, the treated combustion product is then routed to a muffler to attenuate the noise associated with the combustion. It is also known to provide exhaust processors that include substrates that function as particulate traps to filter contaminant particulates without using a catalyst.

Exhaust processors are well known as shown, for example, in U.S. Pat. No. 5,293,743 to Usleman et al.; U.S. Pat. No. 5,118,476 to Dryer et al.; U.S. Pat. No. 4,160,010 to Ottle; U.S. Pat. No. 3,984,207 to Abthoff et al.; U.S. Pat. No. 3,972,687 to Frietzsche; and German Patent No. 3 430 398.

An exhaust processor that includes a housing or can in which a substrate is stuffed is known as a "stuffed can" unit. The ends of the housing may be "sized down" to facilitate attachment of the exhaust processor to an exhaust system. It is known to size down the ends of an exhaust processor as shown, for example, in U.S. Pat. No. 5,118,476 to Dryer et al.; U.S. Pat. No. 4,969,264 to Dryer et al.; U.S. Pat. No. 4,519,120 to Nonnenmann et al.; and U.S. Pat. No. 3,159,239 to Andrews. It is known to use cone-shaped shells to connect an exhaust processor housing to an exhaust system as shown, for example, in U.S. Pat. No. 3,972,687 to Frietzsche and U.S. Pat. No. 4,160,010 to Ottle.

What is needed is an exhaust processor that is assembled with a minimal number of parts, tools, and assembly steps. Such an exhaust processor would reduce manufacturing costs and assembly time.

According to a first preferred method of the present invention, a method is provided for assembling an exhaust processor configured to include a housing formed from a tube having an inlet end and an outlet end, an internal inlet cone shield, a substrate, an internal outlet cone shield, an inlet end, and an outlet end. Combustion product produced by an engine enters the inlet end of the exhaust processor, passes through the substrate to catalyze unwanted contaminant materials included in the combustion product, and exits the outlet end of the exhaust processor.

The first step in assembling the exhaust processor according to the first preferred method of the present invention is sizing the inlet end of the tube down to a desired inlet diameter to form an inlet end of the housing. Second, the internal inlet cone shield is installed into the tube through the outlet end of the tube. Third, the substrate is inserted into the tube through the outlet end of the tube. Fourth, the internal outlet cone shield is installed into the tube through the outlet end of the tube. Fifth, the outlet end of the tube is sized down to a desired outlet diameter to form an outlet end of the housing. The exhaust processor according to the present invention is assembled with a minimal number of parts, tools, and operation steps.

In preferred embodiments of the present invention, standard diameter tubing manufactured on a tube mill is used to produce the housing and inlet and outlet cone shields. This significantly reduces manufacturing cost.

The tooling cost of producing an exhaust processor according to the present invention is minimized because the only tools required to assemble the exhaust processor are "sizing" tools to size the inlet and outlet ends of the housing and one end of the inlet and outlet cone shields, a "stuffing tool" to install the substrate in the housing, and "spot-weld" or mechanical lock stations to attach the inlet and outlet cone shields to the housing.

In preferred embodiments of the present invention, insulation is provided between the inlet cone shield and the housing and also between the outlet cone shield and the housing. In addition, an annular, insulative mat mount surrounds the substrate and separates the substrate from the housing. The insulation and mat mount function to insulate the housing completely from the flow of combustion product passing through the housing and thus the housing is maintained at a lower temperature when combustion product is flowing through the exhaust processor. A less expensive grade of housing material may be used because of the low housing temperature.

According to a second preferred method of the present invention, a method is provided for assembling the exhaust processor using the following steps. The first step in assembling the exhaust processor according to the second preferred embodiment is to insert the substrate into the tube. Second, the internal inlet cone shield is installed into the tube through the inlet end of the tube. Third, the internal outlet cone shield is installed into the tube through the outlet end of the tube. Fourth, the inlet end of the tube is sized down to a desired inlet diameter to form the inlet end of the housing. Fifth, the outlet end of the tube is sized down to a desired outlet diameter to form the outlet end of the housing.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a sectional view of a tube after one end of the tube has been sized down to a desired inlet diameter to form the inlet end of the housing of FIG. 1;

FIG. 3 is a sectional view of the partially assembled exhaust processor of FIG. 2 showing installation of a sized-down inlet cone shield and insulation into the sized-down inlet end of the partly-formed tube of FIG. 2 through the outlet end of the tube;

FIG. 4 is a sectional view of the partially assembled exhaust processor of FIG. 3 showing installation of the substrate and a mat mount around the substrate in the partly-formed tube through the outlet end of the tube being used to form the housing;

FIG. 5 is a sectional view of the partially assembled exhaust processor of FIG. 4 showing installation of a sized-down outlet internal cone shield and insulation into the tube through the outlet end of the tube being used to form the housing;

FIG. 6 is a sectional view of the partially assembled exhaust processor of FIG. 5 showing the outlet end of the tube forming the housing being sized down to a desired outlet diameter to engage the outlet cone shield and to form an outlet end of the housing;

FIG. 7 is a sectional view of a tube showing installation of the substrate and mat mount within the tube through either the inlet end or outlet end of the tube;

FIG. 8 is a sectional view of the partially assembled exhaust processor of FIG. 7 showing installation of a sized-down inlet cone shield into the tube through the inlet end of the tube and a sized-down outlet cone shield into the tube through the outlet end of the tube; and FIG. 9 is a sectional view of the partially assembled exhaust processor of FIG. 8 showing installation of insulation through the inlet and outlet ends of the tube and the inlet and outlet ends of the tube being sized down to a desired inlet diameter and outlet diameter, respectively, to engage the inlet and outlet cone shields, respectively, and to form the inlet and outlet ends of the housing, respectively.

DETAILED DESCRIPTION OF THE DRAWINGS

Figure 1:
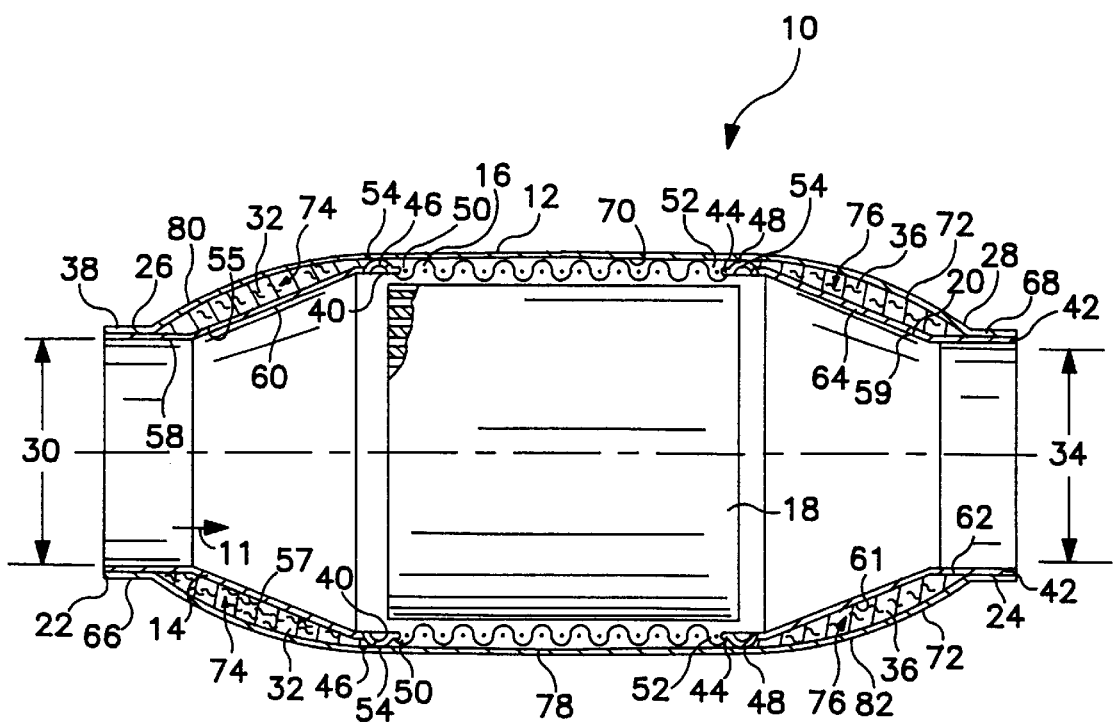
FIG. 1 is a sectional view of an exhaust processor produced using a method according to the present invention and showing a housing having an inlet end and an outlet end, a substrate, an internal inlet cone shield, a mat mount positioned to lie between the substrate and an inner wall of the housing, an internal outlet cone shield, and insulation positioned to lie between the inner wall of the housing and the inlet and outlet cone shields.

An assembled exhaust processor 10 according to the present invention is shown in FIG. 1. Exhaust processor 10 is part of a vehicle exhaust system that takes vehicle exhaust gas or combustion product 11 from an engine (not shown) and transfers it to a tail pipe (not shown) at the back end of a vehicle so that the combustion product 11 can be quietly exhausted into the atmosphere. Exhaust processor 10 removes unwanted contaminate materials from combustion product 11. Exhaust processor 10 is assembled with a minimal number of parts, tools, and assembly steps as discussed below.

Exhaust processor 10 includes a housing 12, an internal inlet cone shield 14, a mat mount 16, a metallic or ceramic catalyzed substrate 18, an internal outlet cone shield 20, an inlet end 22, an outlet end 24, and insulation 32, 36. Combustion product 11 enters inlet end 22 of exhaust processor 10 through an inlet end 26 of housing 12, passes through substrate 18 to catalyze unwanted contaminate materials included in combustion product 11, and exits outlet end 24 of exhaust processor 10 through an outlet end 28 of housing 12. It is within the scope of the present invention to use a particulate trap substrate (not shown) instead of catalyzed substrate 18.

Figure 2:
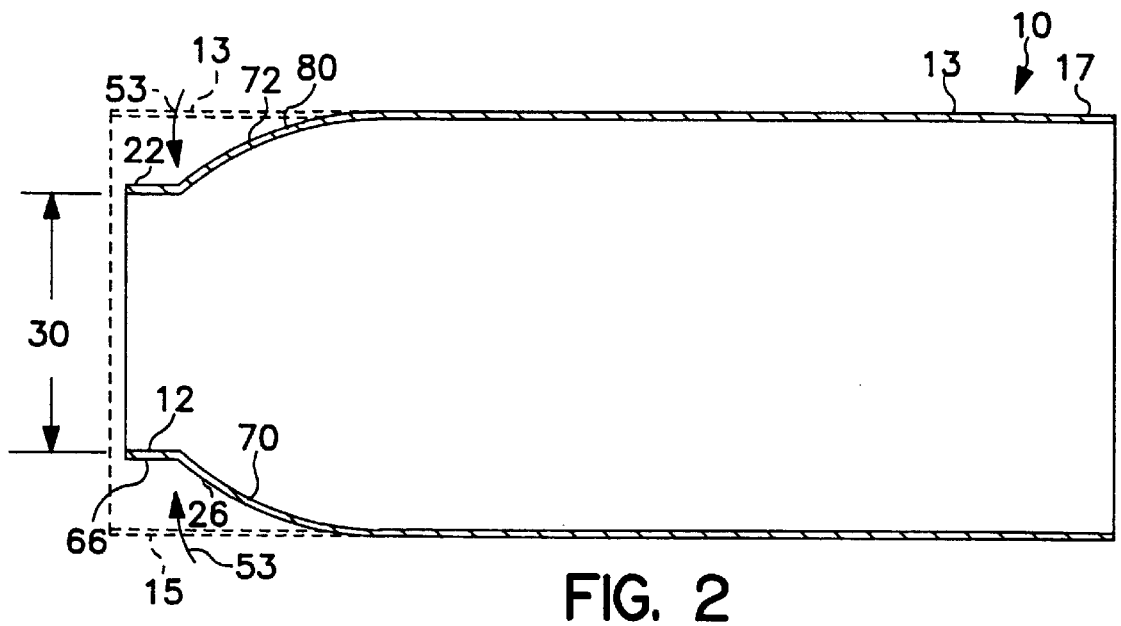
FIGS. 2–6 illustrate the steps of assembling the exhaust processor of FIG. 1 according to a first preferred method of the present invention.
Figure 3:
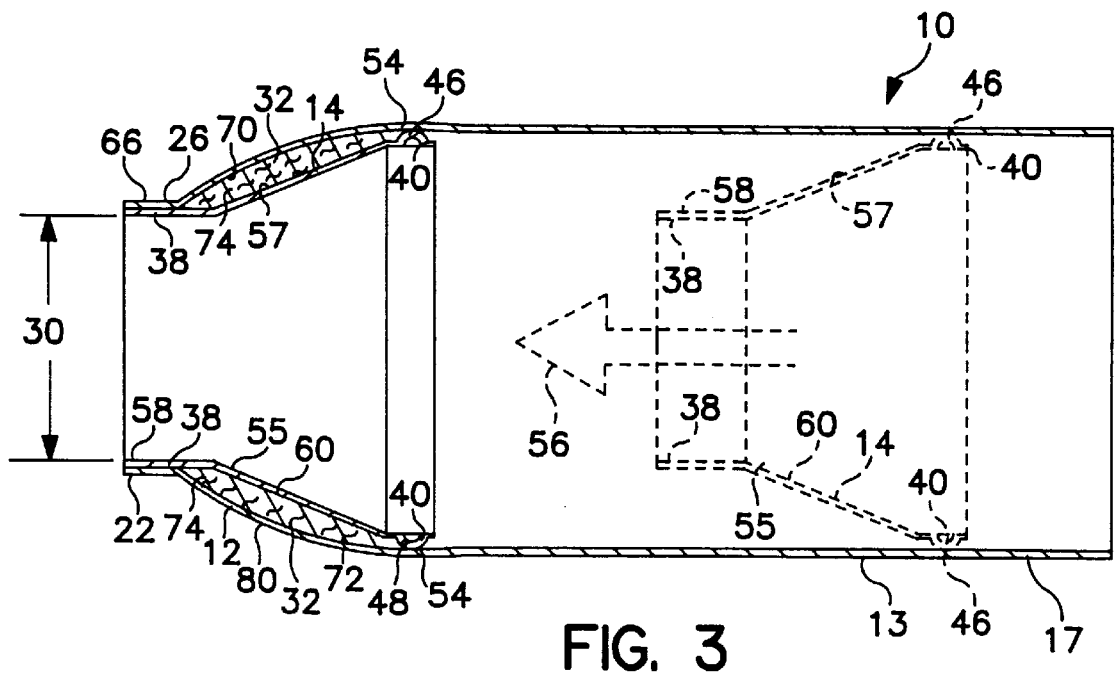
Figure 4:
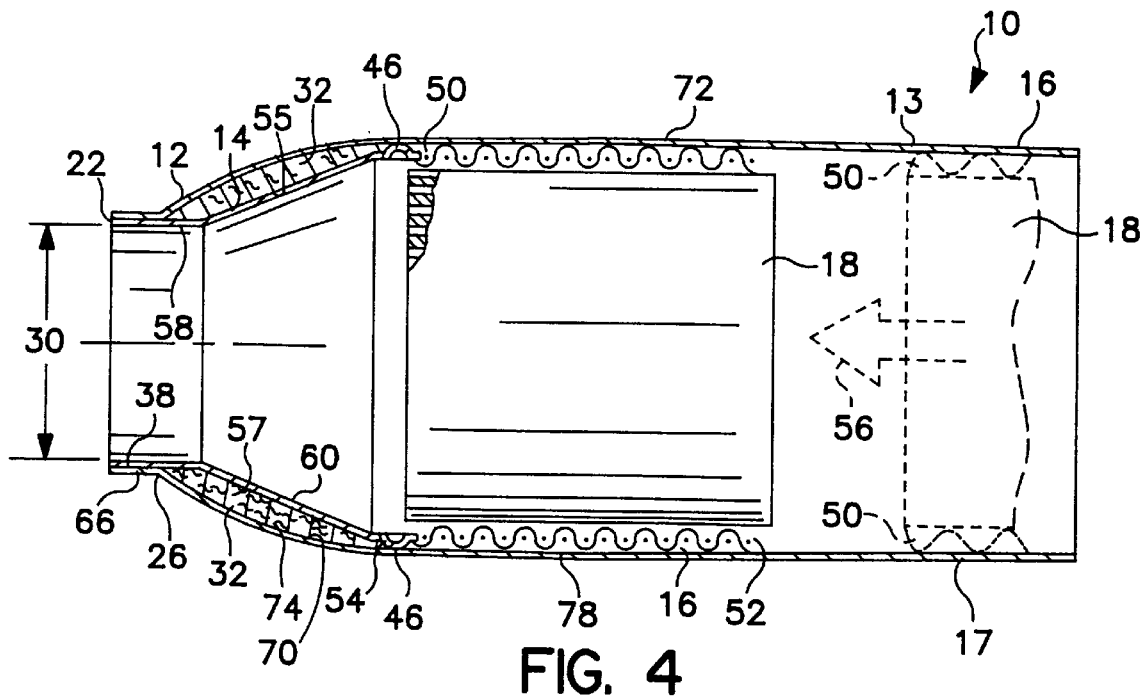
Figure 5:
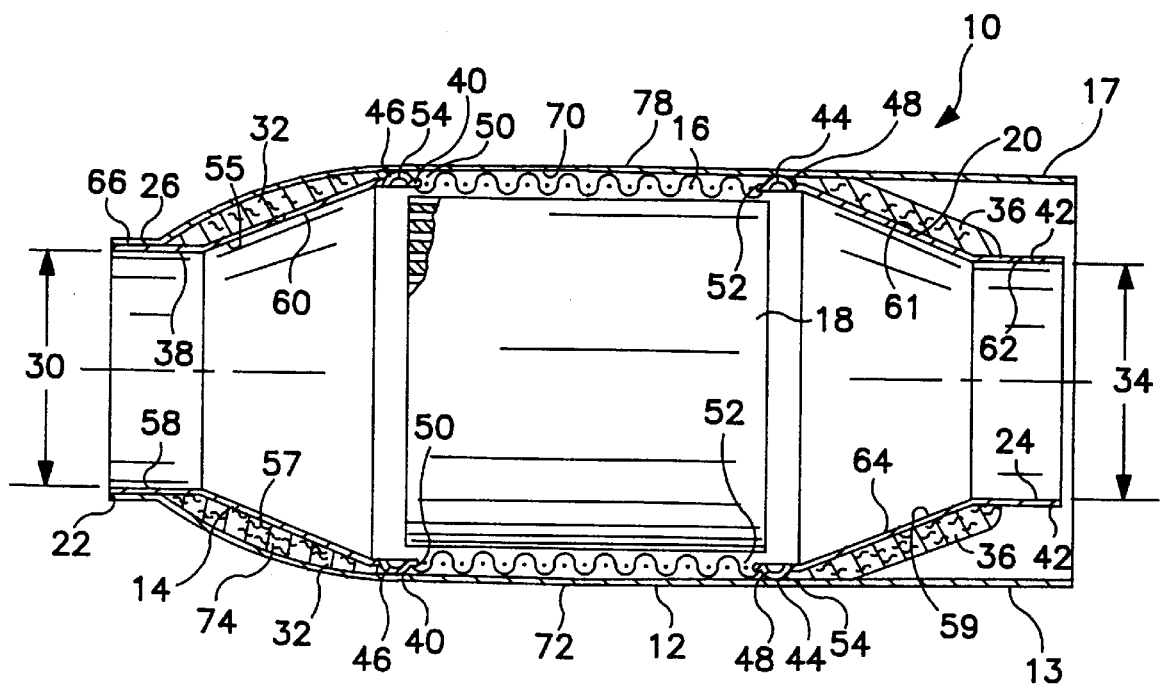
Figures 6, 7:
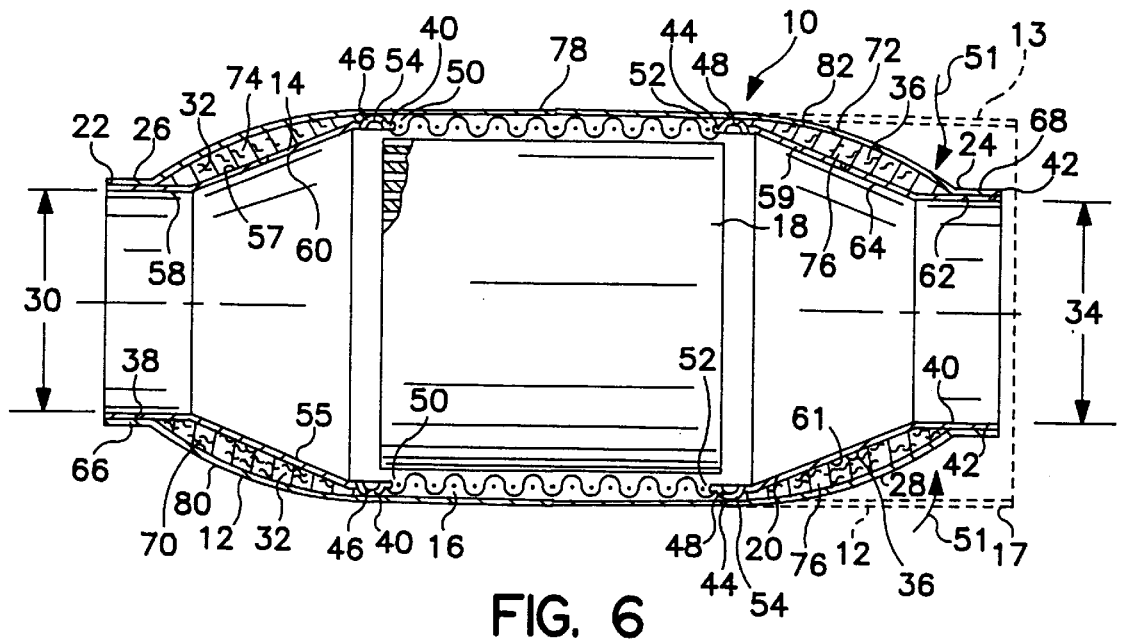
FIGS. 7–9 illustrate the steps of assembling the exhaust processor of FIG. 1 according to a second preferred method of the present invention.

FIGS. 2–6 illustrate the sequence of assembly steps used to assemble exhaust processor 10 according to a first preferred method. Assembly of exhaust processor 10 begins with a tube 13 having an inlet end 15 (dotted lines) and an outlet end 17 (solid lines) as shown in FIG. 2. First, inlet end 15 of tube 13 is sized down in direction 53 to a desired inlet diameter 30 to form inlet end 26 of housing 12 as shown in solid lines in FIG. 2. Next, a sized-down inlet cone shield 14 is installed into sized-down inlet end 15 of partly-formed tube 13 of FIG. 2 through outlet end 17 of tube 13 in direction 56 as shown in FIG. 3. Third, substrate 18 is inserted into partly-formed tube 13 through outlet end 17 of tube 13 being used to form housing 12 in direction 56 as shown in FIG. 4. Next, a sized-down outlet cone shield 20 is installed within tube 13 through outlet end 17 of tube 13 as shown in FIG. 5. Finally, outlet end 17 of tube 13 (dotted lines) is sized down in direction 51 to a desired outlet diameter 34 to engage outlet cone shield 20 and form outlet end 28 (solid lines) of housing 12 as shown in FIG. 6. The assembly and components of exhaust processor 10 are discussed in more detail as follows.

Housing 12 provides structural support for exhaust processor 10 in the exhaust system. In addition, housing 12 shields surrounding vehicle components (not shown) from the heat radiating off substrate 18 and cone shields 14, 20. Housing further includes an inner wall 70 and an outer wall 72.

Inlet cone shield 14 includes a first end 38 appended to inlet end 26 of housing 12, a second end 40 situated adjacent to mat mount 16, an inner wall 55, an outer wall 57, a cylindrical snout 58 situated adjacent to first end 38, a locating dimple 46 situated adjacent to second end 40, and a cylindrical cone-shaped connecting portion 60 extending between snout 58 and locating dimple 46 as shown in FIGS. 1 and 3–6. Outlet cone shield 20 includes a first end 42 attached to outlet end 28 of housing 12, a second end 44 situated adjacent to mat mount 16, an inner wall 59, an outer wall 61, a cylindrical snout 62 situated at first end 42, a locating dimple 48 situated at second end 44, and a cylindrical cone-shaped connecting portion 64 extending between snout 62 and locating dimple 48 as shown in FIGS. 1, 5, and 6. Snouts 58, 62 are formed to engage inlet and outlet pipes (not shown) of the vehicle exhaust system (not shown).

Locating dimples 46, 48 ensure that there is a constant gap between housing 12 and cone shields 14, 20 and thus center cone shields 14, 20 within housing 12. More specifically, locating dimples 46, 48 include an outer surface 54 which engages inner wall 70 of housing 12 to ensure that there is a constant gap between housing 12 and connecting portion 60, 64 of cone shields 14, 20, respectively. In the illustrated embodiment, locating dimples 46, 48 are spaced apart about the perimeter of cone shields 14, 20, respectively. In preferred embodiments, four locating dimples 46 are equally spaced apart every 90° about the perimeter of inlet cone shield 14 and four locating dimples 48 are equally spaced apart every 90° about the perimeter of outlet cone shield 20. In alternative embodiments of the present invention, the locating dimples may extend circumferentially around the entire perimeter of the cone shields or be spaced apart about the perimeter of the cone shields differently.

When tube 13 is sized to form housing 12, housing 12 is formed to include cylindrical inlet and outlet snouts 66, 68 situated at inlet end 26 and outlet end 28, respectively, a central flat portion 78, and inlet and outlet convex-shaped portions 80, 82 extending between cylindrical inlet snout 66 and central flat portion 78 and cylindrical outlet snout 68 and central flat portion 78, respectively. Installing inlet cone shield 14 into tube 13 includes the steps of moving cylindrical snout 58 of inlet cone shield 14 into cylindrical inlet snout 66 formed in housing 12 and centering inlet cone shield 14 within tube 13 using locating dimple 46. Installing outlet cone shield 20 into tube 13 includes the steps of moving outlet cone shield 20 toward mat mount 16 until either second end 44 of outlet cone shield 20 abuts mat mount 16 or penetrates into mat mount 16 and centering outlet cone shield 20 within tube 13 using locating dimple 48. When outlet end 17 of tube 13 is sized down to form outlet end 28 of housing 12, cylindrical outlet snout 68 of housing 12 is formed and engages cylindrical snout 62 of outlet cone shield 20. Snouts 58, 62 of inlet and outlet cone shields 14, 20, respectively, are attached to snouts 66, 68 of housing 12, respectively, by spot welding, staking, or any other suitable means. Inlet cone shield 14 is attached to housing 12 prior to installation of substrate 18 and mat mount 16 within housing 12 as shown in FIGS. 3 and 4.

Cone shields 14, 20 are only required to support their own weight as they are not exposed to any structural loads. This permits cone shields 14, 20 to be made of a thin gauge sheet metal having a low thermal mass or capacitance which minimizes the heat absorbed by cone shields 14, 20. The low thermal mass of the thin gauge sheet metal maximizes the heat reaching substrate 18. This allows more thermal energy in the combustion product 11 to reach substrate 18 during vehicle start up which causes substrate 18 to heat up faster to its minimum operating temperature. Therefore, the catalyst in substrate 18 begins to process combustion product 11 in a shorter period of time, to lower the overall vehicle emissions. The thermal mass or capacitance of a material is the product of the volume, density, and specific heat of the material. U.S. Pat. No. 5,293,743 to Usleman et al. relating to a low thermal capacitance exhaust processor is incorporated herein by reference.

During operation of the engine exhaust system, cone shields 14, 20 are at a higher temperature than housing 12 which results in a differential thermal expansion between inlet and outlet cone shields 14, 20 and housing 12. However, minimal thermal stresses are developed in cone shields 14, 20 and housing 12 because cone shields 14, 20 can move relative to housing 12. Only first end 38 of inlet cone shield 14 is attached to housing 12 and only first end 42 of outlet cone shield 20 is attached to housing 12 as shown in FIGS. 1 and 2–6. Second ends 40, 44 of cone shields 14, 20, respectively, are situated adjacent to mat mount 16 as shown in FIGS. 1 and 4–6. Therefore, seconds ends 40, 44 of cone shields 14, 20 can move relative to housing 12 to reduce or eliminate the thermal stress associated with the differential thermal expansion between cone shields 14, 20 and housing 12.

Mat mount 16 surrounds substrate 18 and separates substrate 18 from housing 12 as shown in FIGS. 1 and 4–6. Mat mount 16 is an annular, shock-absorbent, resilient, and insulative supportive material which is preferably formed of a gas-impervious material that expands substantially when heated. Mat mount 16 is situated adjacent to central flat portion 78 of housing 12 so that heat energy can be transferred from mat mount 16 to housing 12 to keep mat mount 16 from overheating.

Substrate 18 and mat mount 16 are installed into outlet end 28 of housing 12 by using a conventional stuffing funnel (not shown) to compress mat mount 16 as it is installed through outlet end 28 of housing 12 as shown in FIG. 4. Mat mount 16 includes a first end 50 situated adjacent to second end 40 of inlet cone shield 14 and a second end 52 situated adjacent to second end 44 of outlet cone shield 20. Second ends 40, 44 of cone shields 14, 20 may abut or be situated within mat mount 16. More specifically, second ends 40, 44 of cone shields 14, 20 may be glued to mat mount 16 or press fitted into mat mount 16.

Insulation 32, 36 is provided in first and second pockets 74, 76 formed between housing 12 and inlet and outlet cone shields 14, 20, respectively, as shown in FIGS. 1 and 2–6. When snout 58 of inlet cone shield 14 is moved into inlet snout 66 of housing 12, insulation 32 is trapped within first pocket 74 between inner wall 70 at inlet convex-shaped portion 80 of housing 12 and outer wall 57 at connecting portion 60 of inlet cone shield 14. When outlet end 17 of tube 13 is sized down to form outlet end 28 of housing 12 and outlet snout 68 of housing 12 engages snout 62 of outlet cone shield 20, insulation 36 is trapped within second pocket 76 between inner wall 70 at outlet convex-shaped portion 82 of housing 12 and outer wall 61 at connecting portion 64 of outlet cone shield 20.

Insulation 32, 36 and mat mount 16 function to fully insulate housing 12 from the flow of combustion product 11 and thus maintain housing 12 at a lower temperature when combustion product 11 is flowing through exhaust processor 10. This provides three advantages: 1) no external shields (not shown) are required to protect surrounding vehicle components from the heat radiating off substrate 18 and cone shields 14, 20, 2) housing 12 can be made of a less expensive grade of material without sacrificing strength, durability, or corrosion/oxidation resistance because of the low housing 12 temperature, this minimizes the cost of exhaust processor 10, and 3) exhaust processor 10 can be packaged into a smaller clearance envelope.

Insulation 32, 36 is not exposed to the atmosphere as shown in FIG. 1. By not exposing insulation 32, 36 to the atmosphere, the possibility of water wicking into the insulation 32, 36 and accelerating corrosion of housing 12 and cone shields 14, 20 is eliminated. In addition, insulation 32, 36 dampens any "shell ringing" noise caused by pressure pulses in the flow of combustion product 11.

The inlet and outlet ends 15, 17 of tube 13 are sized down to a desired diameter 30, 34, generally to the diameter of the exhaust pipe (not shown) to form housing 12. Similar tubes (not shown) are sized-down to form cone shields 14, 20. More specifically, inlet and outlet ends 15, 17 of tube 13 are sized down to form inlet and outlet ends 26, 28 of housing 12, respectively, and similar tubes (not shown) are sized down to form first ends 38, 42 of cone shields 14, 20, respectively. Tube 13 is sized down by placing the inlet and outlet ends 15, 17 of tube 13 into a die (not shown) having a shaping surface contoured to have a shape matching the final desired shapes of inlet and outlet ends 26, 28 of housing 12. Similar tubes (not shown) are sized down in a similar fashion to form first ends 38, 42 of cone shields 14, 20.

In addition to the ease of assembling exhaust processor 10 through the steps discussed above, there are other manufacturing advantages associated with exhaust processor 10. If substrate 18 is sized properly, standard diameter tubing manufactured on a tube mill can be used for producing tube 13 for housing 12 and similar tubes (not shown) for producing cone shields 14, 20. Using standard diameter tubing produced on a tubing mill to produce housing 12 and cone shields 14, 20 results in a significant cost savings.

In addition, the tooling cost for producing exhaust processor 10 is minimized because the only tools required to assemble exhaust processor 10 are sizing tools to size the ends 26, 28, 38, and 42 of housing 12 and cone shields 14, 20, respectively, a stuffing tool to install substrate 18 and mat mount 16 into housing 12, and spot-weld or mechanical lock stations to attach cone shields 14, 20 to housing 12. A conventional exhaust processor design (not shown) uses expensive stamping tools for both the housing and external shields. In addition, expensive resistance seam welding equipment is required to weld two housing half stampings. Eliminating resistance seam weld flanges minimizes cost and permits exhaust processor 10 to fit into a smaller clearance envelope. Further, no welds are required near mat mount 16 which increases the durability of mat mount 16.

Figure 8:
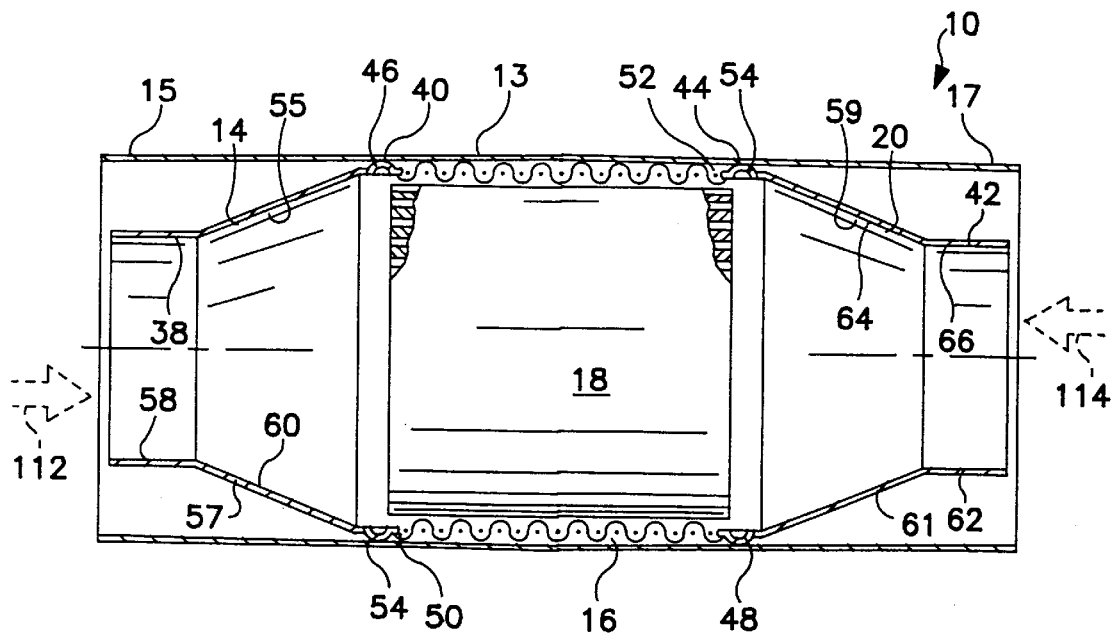
Figure 9:
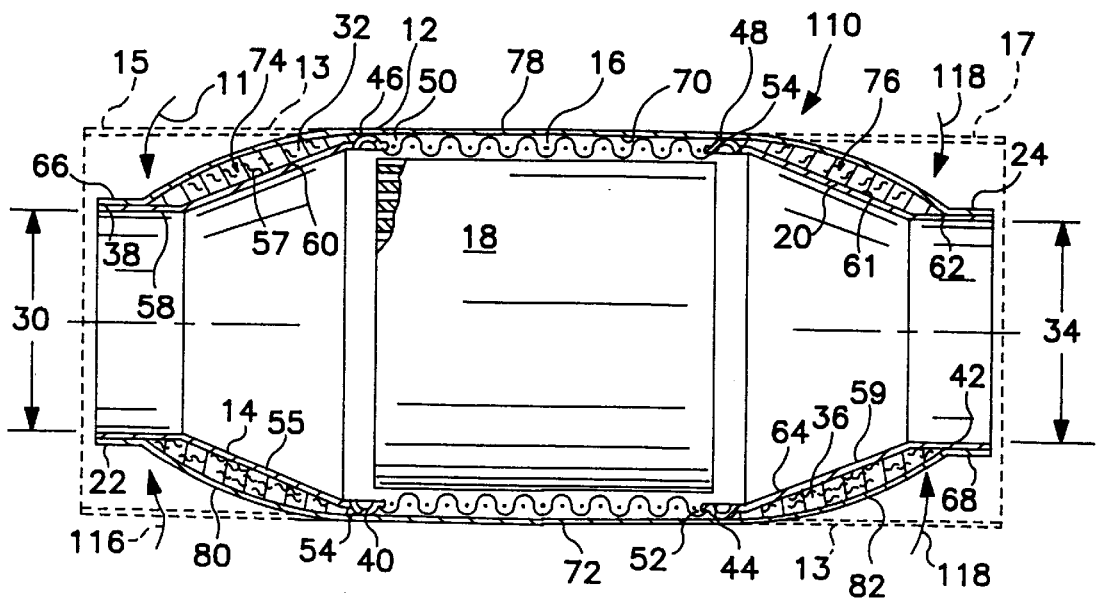

A second preferred method of assembling exhaust processor 110 according to the present invention is shown in FIGS. 7–9. The components of exhaust processor 110 are identical to those of exhaust processor 10 and are thus numbered similarly.

According to the second preferred method, exhaust processor 110 is assembled using the following steps. First, substrate 18 and mat mount 16 are installed into tube 13 as shown in FIG. 7. Substrate 18 and mat mount 16 can be installed into tube 13 through inlet end 15 of tube 13 in direction 112 or through outlet end 17 of tube 13 in direction 114. Second, a sized-down inlet cone shield 14 is installed into tube 13 in direction 112 through inlet end 15 of tube 13 as shown in FIG. 8. Third, a sized-down outlet cone shield 20 is installed into tube 13 through outlet end 17 of tube 13 as shown in FIG. 8. Inlet and outlet cone shields 14, 20 of exhaust processor 110 are connected to mat mount 16 and centered within tube 13 using locating dimples 46, 48 as described above for exhaust processor 10. Fourth, inlet end 15 (dotted lines) of tube 13 is sized-down in direction 116 around inlet cone shield 14 to form inlet end 26 (solid lines) of housing 12 and outlet end 17 (dotted lines) of tube 13 is sized-down in direction 118 around outlet cone shield 20 to form outlet end 28 (solid lines) of housing 12 as shown in FIG. 9.

Inlet end 15 of tube 13 is sized down to form cylindrical inlet snout 66 that engages cylindrical snout 58 of inlet cone shield 14. Outlet end 17 of tube 13 is sized down to form cylindrical outlet snout 68 that engages cylindrical snout 62 of outlet cone shield 20. Snouts 58, 62 of inlet and outlet cone shields 14, 20, respectively, are attached to snouts 66, 68 of housing 12, respectively, by spot welding, staking, or any other suitable means.

Insulation 32, 36 is provided in first and second pockets 74, 76 formed between housing 12 and inlet and outlet cone shields 14, 20, respectively. Insulation 32, 36 is trapped within first and second pockets, respectively, as inlet and outlet ends 15, 17 of tube 13 are sized down to form inlet and outlet ends 26, 28 of housing 12 as shown in FIG. 9.

Exhaust processors 10, 110 are an improvement over conventional exhaust processors. The structure of housing 12 reduces the number of parts, tools, and assembly steps required to produce exhaust processors 10, 110.

Although this invention has been described in detail with reference to certain embodiments, variations and modifications exist within the scope and spirit of the invention as described and as defined in the following claims.

We claim:

1. A method of assembling an exhaust processor, the method comprising the steps of providing a housing for an exhaust processor formed from a tube having an inlet end and an outlet end, an internal inlet cone shield, a substrate, and an internal outlet cone shield, sizing the inlet end of the tube down to a desired inlet diameter to form an inlet end of the housing, installing the internal inlet cone shield into the tube through the outlet end of the tube, inserting the substrate into the tube through the outlet end of the tube, installing the internal outlet cone shield into the tube through the outlet end of the tube, and sizing the outlet end of the tube down to a desired outlet diameter to form an outlet end of the housing.

2. The method of claim 1, further comprising the step of installing a mat mount within the tube through the outlet end of the tube as the substrate is installed, the mat mount being situated between the substrate and housing and adjacent to the housing.

3. The method of claim 2, wherein the internal inlet cone shield has a first end and a second end spaced apart from the first end and the method further comprises the step of situating the second end of the internal inlet cone shield within the mat mount.

4. The method of claim 2, wherein the internal inlet cone shield has a first end and a second end spaced apart from the first end and the method further comprises the step of appending the first end of the internal inlet cone shield to the housing.

5. The method of claim 2, wherein the internal outlet cone shield has a first end and a second end spaced apart from the first end and the method further comprises the step of situating the second end of the internal outlet cone shield within the mat mount.

6. The method of claim 2, wherein the internal outlet cone shield has a first end and a second end spaced apart from the first end and the method further comprises the step of appending the first end of the internal outlet cone shield to the housing.

7. The method of claim 2, further comprising the step of installing insulation before installation of the internal inlet cone shield.

8. The method of claim 2, further comprising the step of installing insulation during installation of the internal inlet cone shield.

9. The method of claim 2, further comprising the step of installing insulation after installation of the internal outlet cone shield.

10. The method of claim 2, further comprising the step of installing insulation during installation of the internal outlet cone shield.

11. The method of claim 1, further comprising the step of installing insulation before installation of the internal inlet cone shield.

12. The method of claim 1, further comprising the step of installing insulation during installation of the internal inlet cone shield.

13. The method of claim 1, further comprising the step of installing insulation after installation of the internal outlet cone shield.

14. The method of claim 1, further comprising the step of installing insulation during installation of the internal outlet cone shield.

15. The method of claim 1, further comprising a step of centering the internal inlet cone shield within the tube before the step of inserting the substrate.

16. The method of claim 15, wherein the internal inlet cone shield includes a first end situated adjacent to the inlet end of the housing and a second end situated adjacent to the mat mount and the second end is formed to include a locating dimple situated adjacent to the housing.

17. The method of claim 1, further comprising a step of centering the internal outlet cone shield within the tube before the step of sizing the outlet end of the tube.

18. The method of claim 17, wherein the internal outlet cone shield includes a first end situated adjacent to the inlet end of the housing and a second end situated adjacent to the mat mount and the second end is formed to include a locating dimple situated adjacent to the housing.

19. The method of claim 1, wherein the inlet end of the housing is formed to include a cylindrical inlet snout and the step of installing the internal inlet cone shield includes the steps of providing the internal inlet cone shield with a cylindrical snout at one end and a locating dimple at another end, moving the cylindrical snout of internal inlet cone shield into the cylindrical inlet snout of the housing, and centering the internal inlet cone shield within the tube using the locating dimple.

20. The method of claim 19, wherein the housing includes an inner wall and an outer wall and the locating dimple includes an outer surface that engages inner wall of the housing.

21. The method of claim 1, wherein the step of installing the internal outlet cone shield includes providing the internal outlet cone shield with a locating dimple, moving the internal outlet cone shield adjacent to the mat mount, and centering the internal outlet cone shield within the tube using the locating dimple.

22. The method of claim 1, wherein the outlet internal cone includes a cylindrical snout at one end and the step of sizing the outlet end of the tube includes the step forming a cylindrical outlet snout at the outlet end of the housing and engaging the cylindrical outlet snout of the housing with the cylindrical snout of the internal outlet cone shield.

23. The method of claim 1, further comprising the steps of providing insulation and trapping the insulation between the internal inlet cone shield and the housing when the internal inlet cone shield is installed into the tube.

24. The method of claim 23, wherein the step of sizing the inlet end of the tube further includes providing the housing with an inlet convex-shaped portion and the insulation is trapped between the internal inlet cone shield and the inlet convex-shaped portion of the housing.

25. The method of claim 1, further comprising the step of providing insulation, wherein the step of sizing the outlet end of the tube down to a desired outlet diameter to form the outlet end of the housing comprises the steps of forming a cylindrical outlet snout and outlet convex-shaped portion of the housing and trapping the insulation between the internal outlet cone shield and the housing.

26. A method of assembling an exhaust processor, the method comprising the steps of
providing a housing for an exhaust processor formed from a tube having an inlet end and an outlet end, an internal inlet cone shield, insulation, a substrate, a mat mount, and an internal outlet cone shield,
sizing the inlet end of the tube down to a desired inlet diameter to form an inlet end of the housing,
installing the internal inlet cone shield into the tube through the outlet end of the tube to trap insulation in a first pocket,
inserting the substrate and mat mount into the tube through the outlet end of the tube,
installing the internal outlet cone shield within the tube through the outlet end of the tube, and
sizing the outlet end of the tube down to a desired outlet diameter to form an outlet end of the housing and trap insulation in a second pocket.

27. A method of assembling an exhaust processor, the method comprising the steps of
providing a housing for an exhaust processor formed from a tube having an inlet end and an outlet end, an internal inlet cone shield having a cylindrical snout, a first end, and a second end spaced apart from the first end and being formed to include a locating dimple, insulation, a substrate, a mat mount, and an internal outlet cone shield having a cylindrical snout, a first end, and a second end spaced apart from the first end and being formed to include a locating dimple,
sizing the inlet end of the tube down to a desired inlet diameter to form an inlet end, cylindrical inlet snout, and inlet convex-shaped portion of the housing,
installing the internal inlet cone shield into the tube through the outlet end of the tube by moving the cylindrical snout of the internal inlet cone shield into the cylindrical inlet snout of the housing to trap the insulation in a first pocket and centering the internal inlet cone shield within the tube using the locating dimple of the internal inlet cone shield,
appending the cylindrical snout of the internal inlet cone shield to the cylindrical inlet snout of the housing,
inserting the substrate and mat mount into the tube through the outlet end of the tube,
installing the substrate into the tube,
installing the internal outlet cone shield and insulation within the tube through the outlet end of the tube by moving the internal outlet cone shield adjacent to the mat mount and centering the internal outlet cone shield within the tube using the locating dimple of the internal outlet cone shield,
sizing the outlet end of the tube down to a desired outlet diameter to form an outlet end, cylindrical outlet snout, and outlet convex-shaped portion of the housing and engage the cylindrical outlet snout of the housing with the cylindrical snout of the internal outlet cone shield to trap the insulation in a second pocket, and
appending the cylindrical snout of the internal outlet cone shield to the cylindrical outlet snout of the housing.

28. A method of assembling an exhaust processor, the method comprising the steps of
providing a housing for an exhaust processor formed from a tube having an inlet end and an outlet end, an internal inlet cone shield, a substrate, and an internal outlet cone shield,
inserting the substrate into the tube,
installing the internal inlet cone shield into the tube through the inlet end of the tube,
installing the internal outlet cone shield into the tube through the outlet end of the tube,
sizing the inlet end of the tube down to a desired inlet diameter to form an inlet end of the housing, and
sizing the outlet end of the tube down to a desired outlet diameter to form an outlet end of the housing.

29. The method of claim 28, wherein the steps of sizing the inlet end of the tube and sizing the outlet end of the tube are performed simultaneously.

30. A method of assembling an exhaust processor, the method comprising the steps of
providing a housing for an exhaust processor formed from a tube having an inlet end and an outlet end, an internal inlet cone shield, insulation, a substrate, a mat mount, and an internal outlet cone shield, inserting the substrate and mat mount into the tube, installing the internal inlet cone shield into the tube through the inlet end of the tube, installing the internal outlet cone shield within the tube through the outlet end of the tube sizing the inlet end of the tube down to a desired inlet diameter to form an inlet end of the housing and a pocket between the internal inlet cone shield and the housing to trap insulation in the first pocket, and sizing the outlet end of the tube down to a desired outlet diameter to form an outlet end of the housing and a second pocket between the internal outlet cone shield and the housing to trap insulation in the second pocket.

31. The method of claim 30, wherein the steps of sizing the inlet end of the tube and sizing the outlet end of the tube are performed simultaneously.

32. A method of assembling an exhaust processor, the method comprising the steps of providing a housing for an exhaust processor formed from a tube having an inlet end and an outlet end, an internal inlet cone shield having a cylindrical snout, a first end, and a second end spaced apart from the first end and being formed to include a locating dimple, insulation, a substrate, a mat mount, and an internal outlet cone shield having a cylindrical snout, a first end, and a second end spaced apart from the first end and being formed to include a locating dimple, installing the substrate and mat mount into the tube, installing the internal inlet cone shield into the tube through the inlet end of the tube by moving the internal inlet cone shield adjacent to the mat mount and centering the internal inlet cone shield within the tube using the locating dimple of the internal inlet cone shield, installing the internal outlet cone shield within the tube through the outlet end of the tube by moving the internal outlet cone shield adjacent to the mat mount and centering the internal outlet cone shield within the tube using the locating dimple of the internal outlet cone shield, inserting insulation through the inlet end of the tube between the tube and internal inlet cone shield and through the outlet end of the tube between the tube and internal outlet cone shield, sizing the inlet end of the tube down to a desired inlet diameter to form an inlet end of the housing, cylindrical inlet snout of the housing, inlet convex-shaped portion of the housing, and a first pocket between the convex-shaped portion of the housing and the internal inlet cone shield and engage the cylindrical inlet snout of the housing with the cylindrical snout of the internal inlet cone shield thereby trapping the insulation in the first pocket, appending the cylindrical snout of the internal inlet cone shield to the cylindrical inlet snout of the housing, sizing the outlet end of the tube down to a desired outlet diameter to form an outlet end of the housing, cylindrical outlet snout of the housing, outlet convex-shaped portion of the housing, and a second pocket between the outlet convex-shaped portion of the housing and the internal outlet cone shield and engage the cylindrical outlet snout of the housing with the cylindrical snout of the internal outlet cone shield thereby trapping the insulation in the second pocket, and appending the cylindrical outlet snout of the housing to the cylindrical snout of the internal outlet cone shield.

33. The method of claim 32, wherein the steps of sizing the inlet end of the tube and sizing the outlet end of the tube are performed simultaneously.

34. A method of assembling an exhaust processor, the method comprising the steps of providing a housing for an exhaust processor formed from a tube having an inlet end and an outlet end, an internal inlet cone shield, insulation, a substrate, a mat mount, an internal outlet cone shield, sizing the inlet end of the tube down to a desired inlet diameter to form an inlet end of the housing, installing the internal inlet cone shield into the tube through the outlet end of the tube to trap the insulation in a first pocket between the internal inlet cone shield and the inlet end of the tube, inserting the substrate and mat mount into the tube through the outlet end of the tube so that the mat mount abuts the housing, installing the internal outlet cone shield and insulation within the tube through the outlet end of the tube by moving the internal outlet cone shield and insulation adjacent to the mat mount, and sizing the outlet end of the tube down to a desired outlet diameter to form an outlet end of the housing thereby trapping the insulation in a second pocket between the internal outlet cone shield and the housing.

35. The method of claim 34, wherein the internal inlet cone shield includes spaced apart first and second ends and further comprising the step of situating the second end of the internal inlet cone shield within the mat mount.

36. The method of claim 34, wherein the internal outlet cone shield includes spaced apart first and second ends and further comprising the step of situating the second end of the internal outlet cone shield within the mat mount.

37. A method of assembling an exhaust processor, the method comprising the steps of providing a housing for an exhaust processor formed from a tube having an inlet end and an outlet end, an internal inlet cone shield, insulation, a substrate, a mat mount, and an internal outlet cone shield, inserting the substrate and mat mount into the tube so that the mat mount abuts the housing, installing the internal inlet cone shield and insulation into the tube by moving the internal inlet cone shield and insulation adjacent to the mat mount, installing the internal outlet cone shield and insulation within the tube by moving the internal outlet cone shield and insulation adjacent to the mat mount, sizing the inlet end of the tube down to a desired inlet diameter to form the inlet end of the housing and thereby trap insulation in a first pocket between the internal inlet cone shield and the inlet end of the housing, and sizing the outlet end of the tube down to a desired outlet diameter to form the outlet end of the housing and thereby trap insulation in a second pocket between the internal outlet cone shield and the outlet end of the housing.

38. The method of claim 37, wherein the steps of sizing the inlet end of the tube and sizing the outlet end of the tube are performed simultaneously.

39. The method of claim 37, wherein the internal inlet cone shield includes spaced apart first and second ends and further comprising the step of situating the second end of the internal inlet cone shield within the mat mount.

40. The method of claim 37, wherein the internal outlet cone shield includes spaced apart first and second ends and further comprising the step of situating the second end of the internal outlet cone shield within the mat mount.

* * * * *